US007320297B2

(12) United States Patent
Kamio et al.

(10) Patent No.: US 7,320,297 B2
(45) Date of Patent: Jan. 22, 2008

(54) INTERNAL COMBUSTION ENGINE

(75) Inventors: Junichi Kamio, Wako (JP); Yukihiko Kiyohiro, Wako (JP); Takashi Bannai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/497,426

(22) Filed: Aug. 2, 2006

(65) Prior Publication Data

US 2007/0034192 A1 Feb. 15, 2007

(30) Foreign Application Priority Data

Aug. 10, 2005 (JP) ............................. 2005-231521

(51) Int. Cl.
*F02B 1/12* (2006.01)
(52) U.S. Cl. ..................................... 123/1 A; 123/27 R
(58) Field of Classification Search ................ 123/1 A, 123/27 R
See application file for complete search history.

(56) References Cited

U.S. PATENT DOCUMENTS

| 4,031,864 | A | * | 6/1977 | Crothers ..................... 123/1 A |
| 4,495,930 | A | * | 1/1985 | Nakajima ..................... 123/575 |
| 4,998,518 | A | * | 3/1991 | Mitsumoto ................... 123/306 |
| 5,450,832 | A | * | 9/1995 | Graf ............................. 123/515 |
| 6,237,562 | B1 | * | 5/2001 | Awasaka et al. ............. 123/305 |
| 6,907,870 | B2 | * | 6/2005 | zur Loye et al. ............ 123/594 |
| 2003/0196641 | A1 | * | 10/2003 | Ashida et al. ............... 123/432 |
| 2004/0250803 | A1 | * | 12/2004 | Kitamura et al. ....... 123/568.31 |

FOREIGN PATENT DOCUMENTS

| JP | 2000-213444 A | 2/2000 |
| JP | 2001-355471 A | 12/2001 |

* cited by examiner

*Primary Examiner*—Stephen K. Cronin
*Assistant Examiner*—Jason Benton
(74) *Attorney, Agent, or Firm*—Birch, Stewart, Kolasch & Birch, LLP

(57) ABSTRACT

There is provided an internal combustion engine that uses a blended fuel consisting of hydrocarbon and alcohol, and can efficiently operate relative to a wide range of required load. The internal combustion engine includes: intake ports 4*a* and 4*b* and two injectors 5*a* and 5*b*. The injectors include a first injector 5*a* that injects a hydrocarbon fuel and a second injector 5*b* that injects an alcohol fuel. An optimum combustion mode is selected according to an operation state, and the ratio of the alcohol is properly adjusted according to the combustion mode. The intake ports includes a first intake port 4*a* that guides the hydrocarbon fuel to an inner peripheral portion of a combustion chamber, and a second intake port 4*c* that guides the alcohol fuel to an outer peripheral portion of the combustion chamber to control octane number distribution in a cylinder. The internal combustion engine further includes separating means 8 for adding water to a blended fuel consisting of alcohol and hydrocarbon to separate into the alcohol fuel consisting of the alcohol and the water and the hydrocarbon fuel.

8 Claims, 2 Drawing Sheets

INTERNAL COMBUSTION ENGINE

BACKGROUND OF THE INVENTION

1. Field of the Invention

The present invention relates to an internal combustion engine that uses a blended fuel consisting of hydrocarbon and alcohol.

2. Description of the Related Art

In recent years, compression ignition internal combustion engines such as homogeneous charge compression ignition internal combustion engines have been studied in order to increase gas mileage of an internal combustion engine and reduce emissions. The compression ignition internal combustion engine introduces oxygen-containing gas and fuel capable of compression self-ignition into a cylinder for compression and self-ignition.

However, the compression ignition internal combustion engine has a problem that control of ignition timing is difficult unlike an internal combustion engine of a spark ignition type, and an operable area with stability is narrow. More specifically, this problem is that using a fuel with high ignitability may easily cause knocking when a required load of the engine is increased, and using a fuel with low ignitability may easily cause misfire when the required load of the engine is reduced.

In order to solve the problem, a technique has been known of mixing a fuel with high ignitability and a fuel with low ignitability and supplying the mixed fuels to the engine (for example, see Japanese Patent Laid-Open No. 2001-355471). According to this technique, a mixing ratio between the fuels is adjusted according to a required load of a compression ignition internal combustion engine, thereby allowing a stable operation relative to a wide range of required load. In this technique, however, the fuel with high ignitability and the fuel with low ignitability need to be separately prepared and housed.

On the other hand, a technique has been also known of using a single fuel, and oxidizing part of the fuel when a required load of a compression ignition internal combustion engine is increased, thereby generating ignitability inhibiting substance (for example, see Japanese Patent Laid-Open No. 2000-213444). More specifically, this technique is to oxidize part of a hydrocarbon fuel such as gas oil to generate ignitability inhibiting substance such as formaldehyde. However, partial oxidation of hydrocarbon such as the gas oil to generate formaldehyde requires a long-time reaction at high temperature.

As a fuel of an internal combustion engine, a blended fuel consisting of hydrocarbon and alcohol has been studied. When ethanol is used as the alcohol, the blended fuel can obtain a so-called carbon neutral effect by ethanol, thereby contributing to a reduction in an emission amount of carbon dioxide. The carbon neutral effect means that plants that are raw materials of ethanol absorb carbon dioxide through photosynthesis in its growing process, and thus burning ethanol to generate carbon dioxide is not considered to emit additional carbon dioxide as a whole.

However, when the blended fuel is supplied to a cylinder as a single fuel like gasoline and ignited by spark ignition, a sufficiently high efficiency cannot be obtained.

SUMMARY OF THE INVENTION

The present invention has an object to provide an internal combustion engine that solves the above described problems, uses a blended fuel consisting of hydrocarbon and alcohol, and can efficiently operate relative to a wide range of required load.

In order to achieve the object, the present invention provides an internal combustion engine comprising: intake ports that guide combustion exhaust gas to a combustion chamber; and two injectors that inject fuels to the intake ports, wherein the injectors comprise a first injector that injects a hydrocarbon fuel and a second injector that injects an alcohol fuel.

In the internal combustion engine according to the present invention, the first injector injects the hydrocarbon fuel, and the second injector injects the alcohol fuel, and thus jet quantities of the hydrocarbon fuel and the alcohol fuel can be independently controlled according to a required load of the internal combustion engine. Thus, according to the internal combustion engine of the present invention, jet ratios of the hydrocarbon fuel and the alcohol fuel can be easily adjusted, thereby allowing control to an optimum combustion mode and an efficient operation relative to a wide range of required load.

Specifically, the jet ratios of the hydrocarbon fuel and the alcohol fuel are adjusted so that the ratio of the hydrocarbon fuel injected from the first injector is higher than the ratio of the alcohol fuel injected from the second injector at low load, and the ratio of the alcohol fuel injected from the second injector is higher than the ratio of the hydrocarbon fuel injected from the first injector at high load.

In the internal combustion engine according to the present invention, the combustion chamber may comprise an ignition plug so as to be switchable between self compression ignition and forced ignition with the ignition plug. In this case, the internal combustion engine is controlled to an optimum combustion mode according to a required load. Specifically, when the compression ignition is possible, the ratio of the alcohol fuel is properly maintained, and ignition timing is properly controlled. When the forced ignition with the ignition plug is performed, the ratio of the alcohol fuel is controlled so as to prevent knocking even when ignition timing is set to provide maximum efficiency.

In the internal combustion engine according to the present invention, the intake ports comprise a first intake port that guides the hydrocarbon fuel injected from the first injector to an inner peripheral portion of the combustion chamber, and a second intake port that guides the alcohol fuel injected from the second injector to an outer peripheral portion of the combustion chamber. As the first intake port, for example, a general straight type intake port may be used. As the second intake port, for example, a swirl port may be used.

The first and second intake ports can form octane number distribution in the combustion chamber by the fuels guided to the combustion chamber so that an area with a low octane number is formed in the inner peripheral portion of the combustion chamber and an area with a high octane number is formed in the outer peripheral portion of the combustion chamber, thereby preventing knocking at high load. The first and second intake ports are used together with the adjustment of the jet ratios of the alcohol fuel and the hydrocarbon fuel, thereby further reliably preventing knocking at high load.

Further, the internal combustion engine according to the present invention may separately comprises the alcohol fuel and the hydrocarbon fuel, and preferably comprises separating means for adding water to a blended fuel consisting of alcohol and hydrocarbon to separate into the alcohol fuel consisting of the alcohol and the water and the hydrocarbon fuel consisting of the hydrocarbon.

When the water is added to the blended fuel by the separating means, the alcohol is soluble in the water to form an alcohol/water mixture, while the hydrocarbon is insoluble in the water and separated from the mixture. The mixture containing water has a larger specific gravity than the hydrocarbon, and thus the mixture and the hydrocarbon are separated into two upper and lower layers by gravity. Thus, two kinds of fuels of the alcohol fuel consisting of the mixture and the hydrocarbon fuel consisting of the hydrocarbon can be easily obtained from the single blended fuel by the separating means.

DETAILED DESCRIPTION OF THE PREFERRED EMBODIMENTS

Figure 1:
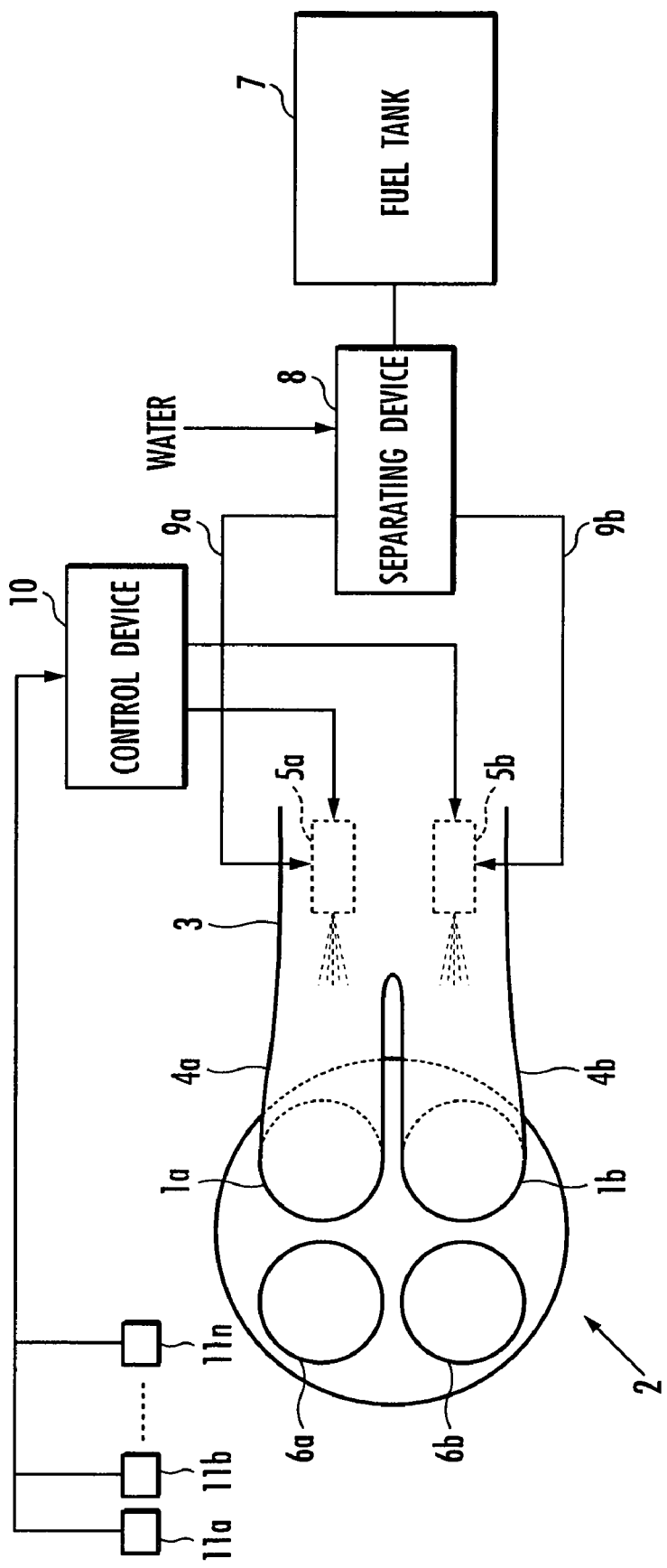
FIG. 1 is a system configuration diagram showing an exemplary configuration of an internal combustion engine according to the present invention.
Figure 2:
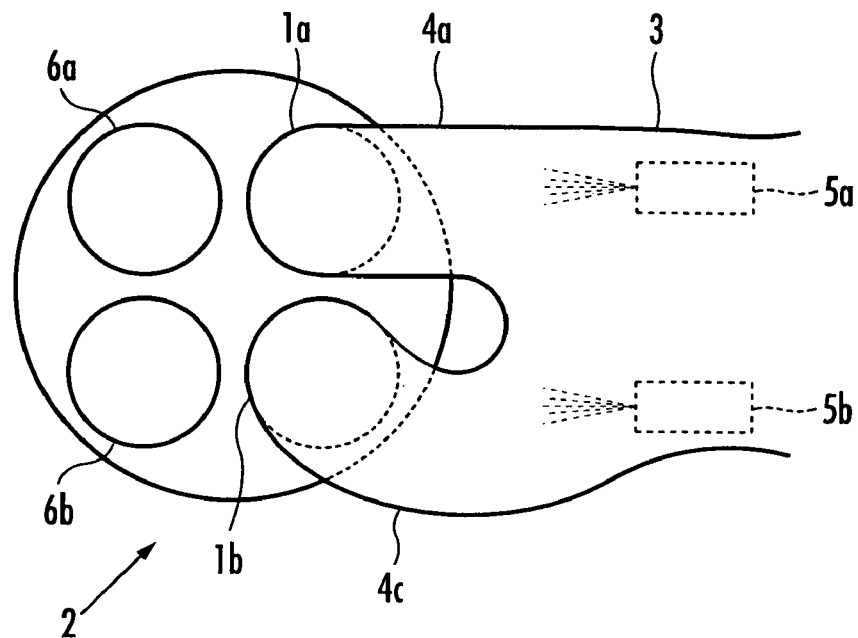
FIG. 2 shows a variation of intake ports in FIG. 1.
Figure 3:
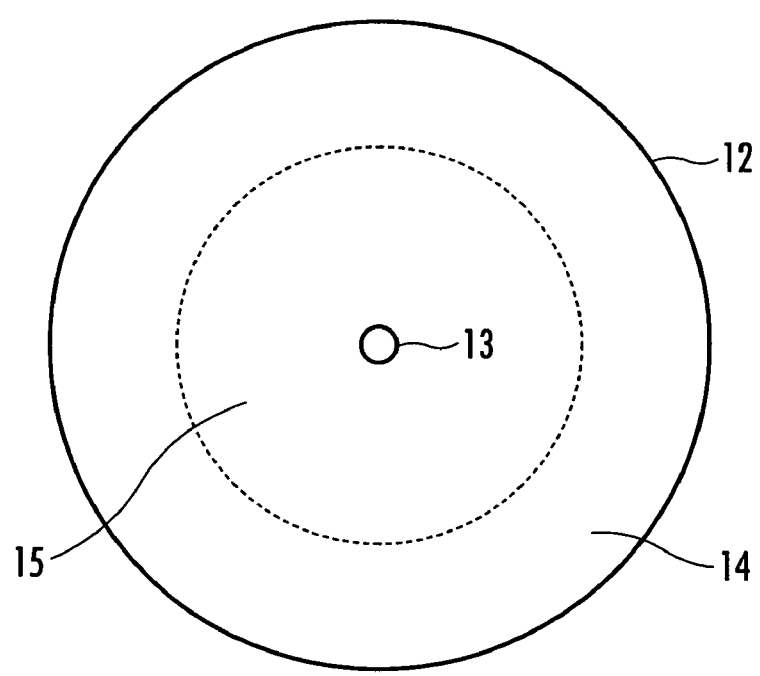
FIG. 3 is an illustrative sectional view of a cylinder comprising the intake ports in FIG. 2.

Now, an embodiment of the present invention will be described in more detail with reference to the accompanying drawings. FIG. 1 is a system configuration diagram showing an exemplary configuration of an internal combustion engine according to the present invention, FIG. 2 shows a variation of in take ports in FIG. 1, and FIG. 3 is an illustrative sectional view of a cylinder comprising the intake ports in FIG. 2.

As shown in FIG. 1, the internal combustion engine according to the embodiment comprises a cylinder head 2 comprising two intake valves 1a and 1b, and an intake pipe 3 connected to the intake valves 1a and 1b. The cylinder head 2 forms atop of an unshown cylinder, and the cylinder is provided with an ignition plug.

A tip of the intake pipe 3 is divided into two parts to form an intake port 4a connected to the intake valve 1a and an intake port 4b connected to the intake valve 1b. The intake ports 4a and 4b both are of a straight type, and an injector 5a that injects a hydrocarbon fuel to the intake port 4a, and an injector 5b that injects an alcohol fuel to the intake port 4b are provided in the intake pipe 3. The cylinder head 2 comprises exhaust gas valves 6a and 6b together with the intake valves 1a and 1b, and the exhaust gas valves 6a and 6b are connected to an unshown exhaust pipe.

The internal combustion engine comprises a fuel tank 7 that stores a blended fuel consisting of alcohol and hydrocarbon, and a separating device 8 that adds water to the blended fuel supplied from the fuel tank 7 to separate the blended fuel into an alcohol fuel consisting of an alcohol/water mixture and a hydrocarbon fuel consisting of hydrocarbon. The separating device 8 is connected to the injector 5a via a conduit 9a that supplies the hydrocarbon fuel, and connected to the injector 5b via a conduit 9b that supplies the alcohol fuel.

Further, the internal combustion engine comprises a control device 10 that controls jet quantities and jet ratios of the hydrocarbon fuel injected from the injector 5a and the alcohol fuel injected from the injector 5b. The control device 10 is connected to operation state amount sensors 11a, 11b, . . . , 11n that detect various amounts relating to an operation state of the internal combustion engine.

Next, an operation of the internal combustion engine will be described.

The internal combustion engine according to the embodiment uses a blended fuel consisting of liquid hydrocarbon and alcohol such as ethanol, and the blended fuel is stored in the fuel tank 7. The blended fuel is supplied from the fuel tank 7 to the separating device 8, and mixed with water added by the separating device 8.

The alcohol that constitutes the blended fuel is soluble in water, while the liquid hydrocarbon is insoluble in water. Thus, when the water is mixed with the blended fuel as described above, the alcohol and the water are mixed to form a mixture, while the liquid hydrocarbon is separated. The water/alcohol mixture containing water has a larger specific gravity than the liquid hydrocarbon, and thus the water/alcohol mixture and the liquid hydrocarbon are separated into two upper and lower layers by gravity. Then, a liquid hydrocarbon layer is formed in an upper layer, and a water/alcohol mixture layer is formed in a lower layer.

Then, the conduit 9a is connected to a part where the liquid hydrocarbon layer is formed in the separating device 8, and the conduit 9b is connected to a part where the water/alcohol mixture layer is formed, thereby allowing the liquid hydrocarbon and the water/alcohol mixture to be easily independently drawn. The liquid hydrocarbon separated by the separating device 8 is supplied as the hydrocarbon fuel to the injector 5a via the conduit 9a, and the water/alcohol mixture is supplied as the alcohol fuel to the injector 5b via the conduit 9b.

In the internal combustion engine according to the embodiment, the operation state amount sensors 11a, 11b, 11n detect operation state amounts such as the temperature, pressure, torque, or RPM of the engine, and outputs detection signals to the control device 10. The control device 10 grasps an operation state of the engine from the detection signals of the operation state amount sensors 11a, 11b, . . . , 11n to set an optimum combustion mode. Then, the control device 10 sets the jet quantities and the jet ratios of the hydrocarbon fuel injected from the injector 5a and the alcohol fuel injected from the injector 5b according to the set combustion mode. The jet ratios of the fuels are generally adjusted so that the ratio of the hydrocarbon fuel injected from the injector 5a is higher than the ratio of the alcohol fuel injected from the injector 5b at low load, and the ratio of the alcohol fuel injected from the injector 5b is higher than the ratio of the hydrocarbon fuel injected from the injector 5a at high load. For compression ignition, however, the ratio of the alcohol fuel is adjusted so as to obtain optimum ignition timing. For forced ignition with the ignition plug, the ratio of the alcohol fuel is adjusted so as to prevent knocking even when ignition timing is optimum.

Then, the control device 10 detects knocking. When detecting no knocking, the control device 10 maintains the setting of the jet quantities and the jet ratios and the setting of the ignition mode. When detecting the knocking, the control device 10 adjusts the jet quantities and the jet ratios of the fuels so that the ratio of the alcohol fuel injected from the injector 5b is increased. The control device 10 delays the ignition timing of the ignition plug when the ratio of the alcohol fuel injected from the injector 5b cannot be increased any more.

In the internal combustion engine according to the embodiment, the jet quantities and the jet ratios of the hydrocarbon fuel injected from the injector 5a and the alcohol fuel injected from the injector 5b are independently set. Then, the hydrocarbon fuel injected from the injector 5a and the alcohol fuel injected from the injector 5b are linearly supplied from the straight type intake ports 4a and 4b into the cylinder, and mixed in the cylinder. Thus, according to the internal combustion engine of the embodiment, an average octane number and an average air/fuel ratio of the fuels injected into the cylinder can be continuously adjusted to prevent knocking at high load.

In the internal combustion engine in FIG. 1, the intake ports 4a and 4b both are of the straight type, but as shown in FIG. 2, a swirl type intake port 4c may be used instead of the straight type intake port 4b. In the configuration in FIG. 2, the hydrocarbon fuel injected from the injector 5a is linearly supplied to the inner peripheral portion of the cylinder by the straight type intake port 4a, while the alcohol fuel injected from the injector 5b is introduced into the cylinder while being circulated in a curved manner by the swirl type intake port 4c, and supplied intensively to the outer peripheral portion of the cylinder by centrifugal force.

Thus, as shown in FIG. 3, a low concentration area 15 with a low alcohol concentration is formed around an ignition plug 13 provided in the center of the cylinder 12 and in the inner peripheral portion of the cylinder 12, and a high concentration area 14 with a high alcohol concentration is formed in the outer peripheral portion along an inner wall of the cylinder 12. Thus, in the fuels injected into the cylinder 12, octane number distribution can be formed having a lower octane number in the inner peripheral portion of the cylinder 12 and a higher octane number in the outer peripheral portion, thereby effectively preventing knocking at high load. The octane number distribution can be continuously adjusted by changing the jet ratios of the hydrocarbon fuel injected from the injector 5a and the alcohol fuel injected from the injector 5b.

In the configuration in FIG. 2, air/fuel ratio distribution may be adjusted by changing the jet quantities of the hydrocarbon fuel injected from the injector 5a and the alcohol fuel injected from the injector 5b.

In the configuration in FIG. 2, an average octane number and an average air/fuel ratio may be adjusted as in the configuration in FIG. 1. The adjustment of the octane number distribution and the air/fuel ratio distribution is performed together with the adjustment of the average octane number and the average air/fuel ratio, thereby further effectively preventing knocking at high load.

In the internal combustion engine according to the embodiment, the blended fuel consisting of liquid hydrocarbon and alcohol is separated by the separating device 8 to obtain the hydrocarbon fuel and the alcohol fuel, but the hydrocarbon fuel and the alcohol fuel may be previously housed in different tanks.

What is claimed is:

1. An internal combustion engine comprising:
   intake ports that guide combustion exhaust gas to a combustion chamber; and
   two injectors that inject fuels to said intake ports,
   wherein said injectors comprise a first injector that injects a hydrocarbon fuel and a second injector that injects an alcohol fuel,
   wherein said intake ports comprise a first intake port that guides said hydrocarbon fuel injected from the first injector to an inner peripheral portion of said combustion chamber, and a second intake port that guides said alcohol fuel injected from the second injector to an outer peripheral portion of said combustion chamber.

2. The internal combustion engine according to claim 1, wherein the ratio of said hydrocarbon fuel injected from the first injector is higher than the ratio of said alcohol fuel injected from the second injector at low load, and the ratio of said alcohol fuel injected from the second injector is higher than the ratio of said hydrocarbon fuel injected from the first injector at high load.

3. The internal combustion engine according to claim 1, wherein said combustion chamber comprises an ignition plug so as to be switchable between self compression ignition and forced ignition with said ignition plug.

4. The internal combustion engine according to claim 1, wherein said first intake port is a straight type intake port.

5. The internal combustion engine according to claim 1, wherein said second intake port is a swirl port.

6. The internal combustion engine according to claim 1, further comprising separating means for adding water to a blended fuel consisting of alcohol and hydrocarbon to separate into the alcohol fuel consisting of the alcohol and the water and the hydrocarbon fuel consisting of the hydrocarbon.

7. The internal combustion engine according to claim 6, wherein said alcohol is ethanol.

8. An internal combustion engine comprising:
   intake ports that guide combustion exhaust gas to a combustion chamber; and
   two injectors that inject fuels to said intake ports,
   wherein said injectors comprise a first injector that injects a hydrocarbon fuel and a second injector that injects an alcohol fuel,
   wherein said intake ports comprise a first intake port that guides said hydrocarbon fuel injected from the first injector to an inner peripheral portion of said combustion chamber, and a second intake port that guides said alcohol fuel injected from the second injector to an outer peripheral portion of said combustion chamber,
   wherein said first intake port is a straight type intake port, and
   wherein said second intake port is a swirl port.

* * * * *